United States Patent [19]
Orr

[11] Patent Number: 6,045,302
[45] Date of Patent: Apr. 4, 2000

[54] DRILL BIT RETRIEVER DEVICE

[76] Inventor: Pat Orr, 616 2nd Ave. NW., Cascade, Iowa 52033

[21] Appl. No.: 09/261,092

[22] Filed: Mar. 4, 1999

[51] Int. Cl.[7] .................................................... B23B 51/00
[52] U.S. Cl. .......................... 408/83; 408/200; 408/204; 408/226
[58] Field of Search ................... 408/72 B, 81, 408/83, 200, 204, 225, 226, 227, 241 G

[56] References Cited

U.S. PATENT DOCUMENTS

| | | | |
|---|---|---|---|
| 2,344,143 | 3/1944 | Harding . | |
| 3,182,531 | 5/1965 | Moore et al. . | |
| 3,199,382 | 8/1965 | Andreasson . | |
| 3,645,642 | 2/1972 | Koslow . | |
| 3,648,508 | 3/1972 | Hougen | 408/204 |
| 3,778,180 | 12/1973 | Ostrom . | |
| 3,806,270 | 4/1974 | Tanner et al. . | |
| 3,825,362 | 7/1974 | Hougen | 408/204 |
| 3,945,753 | 3/1976 | Byers et al. . | |
| 4,189,266 | 2/1980 | Koslow . | |
| 4,239,427 | 12/1980 | Walton, II . | |
| 4,244,667 | 1/1981 | Timmons . | |
| 4,297,059 | 10/1981 | Miyanaga | 408/204 |
| 5,092,719 | 3/1992 | Zsiger . | |
| 5,205,685 | 4/1993 | Herbert | 408/204 |
| 5,597,274 | 1/1997 | Behner | 408/204 |

*Primary Examiner*—Daniel W. Howell
*Attorney, Agent, or Firm*—Tipton L. Randall

[57] ABSTRACT

A cutting tool assembly for cutting holes in a work piece is disclosed. The assembly includes a cutting tool member with a cylindrical cutting member, a shank member, and a guide means providing at least one guide surface tapering from the cutting member to the shank member to assist in removing the assembly from a hole cut in the work piece. Also disclosed is a conical guide member that fastens to a cutting tool providing a guide surface for the stated purpose.

20 Claims, 13 Drawing Sheets

DRILL BIT RETRIEVER DEVICE

FIELD OF THE INVENTION

The invention relates to a device to assist in removing a cutting tool from a hole and, more particularly, to a device for removal of a cutting tool or a hole saw from a hole.

BACKGROUND OF THE INVENTION

Drill bits are well known devices for cutting or boring holes in a wide variety of materials. The well known twist drill bit and the helical shaft auger type bit both have one or more cutting edges mounted on one end of an elongated cylindrical shaft of uniform diameter. The elongated shaft maintains the orientation of the cutting edges in the hole produced to generate a straight bore. Once the twist or helical auger drill bit completes cutting the hole, it is easily withdrawn because the elongated cylindrical shaft in contact with the interior surface of the bore guides the drill bit removal therefrom.

Another variety of drill bit is available for cutting holes in materials, including sheet material up to several inches thick. This variety is called a hole bit, a hole boring tool, a Forstner bit, or a Selfeed bit. The hole bit has one or more cutting edges on one end of a relatively short cylinder with an opening ahead of the cutting edge to remove cutting chips. A shank or shaft of smaller diameter than the short cylinder is fastened opposite the cutting edges for attachment to the chuck of a drill. Hole bits are available having a cylinder diameter up to about 6 inches and even larger. The hole bits also may employ cutting teeth around the circumference of the cutting cylinder in addition to the cutting edges on the face of the cylinder. In addition, a penetrating spike in the center of the cutting face may be present to hold the hole bit at a specific location during the cutting of a hole.

The hole saw cutting tool is similar in construction to the hole bit. The hole saw has no cutting edges on the cylinder end. The saw tool has only cutting teeth around the circumference of the cutting cylinder and a penetrating spike in the center of the cutting face to hold the hole saw at a specific location during the cutting or sawing of a hole. The hole saw cutting tool has no opening to remove the cut out plug from the produced hole, and thus the saw tool is generally limited to use on sheet material work pieces up to several inches thick. Examples of both the hole bit and the hole saw are shown in FIG. 1 and FIG. 8, respectively.

When using the above-described hole bit or hole saw for cutting holes in materials, including sheet material up to several inches thick, withdrawal of the hole bit or hole saw from the cut hole can be difficult, particularly for a larger diameter hole bit or hole saw. Once the short cylindrical cutting portion of the tool moves through the cut hole, the operator must perfectly align the cutting cylinder in the cut hole to withdraw the hole bit or hole saw. This is time consuming and impedes the cutting of multiple holes as may be needed in a production facility.

Some examples of innovative devices used for drilling or cutting holes are disclosed by the following patents. Harding, in U.S. Pat. No. 2,344,143, discloses a twist drill bit fitted with a countersink and depth gauge. Moore et al., in U.S. Pat. No. 3,182,531, describe a reamer of uniform diameter. In U.S. Pat. No. 3,199,382, Andreasson discloses a drill bit with a hollow shank for cooling fluid, and a reaming insert of hard material. The whole device is of essentially uniform diameter.

In U.S. Pat. No. 3,778,180, Ostrom discloses a twist drill with a larger diameter shank for use in drilling printed circuit boards. Tanner et al., in U.S. Pat. No. 3,806,270, describe a fluted twist drill bit with a head part of greater diameter than the body part. The drill bit fits into a tubular drill stem that delivers a fluid for flushing away cuttings from the hole. U.S. Pat. No. 3,945,753 by Byers et al. discloses a drill bit with detachable blades and shank, the shank having a much smaller diameter than the diameter of the drill bit.

Walton, II, in U.S. Pat. No. 4,239,427, and Timmons, in U.S. Pat. No. 4,244,667, disclose a boring tool with several small triangular shaped supports between a circular drill bit and a connecting holder for the drill bit shank. In U.S. Pat. No. 5,092,719, Zsiger describes a drilling/cutting tool with a single or double spiral shank to assist in removal of chips during the cutting/drilling process. The spiral shank is decidedly smaller than the diameter of the hole produced.

In U.S. Pat. No. 3,645,642, Koslow describes a drill bit with a twist bit cutting end that has a progressively increasing diameter extending from a cutting end of small diameter to a rearward section of largest diameter, then tapering to a shank section of smaller diameter. The tapered drill bit prevents binding when drilling deep holes. In U.S. Pat. No. 4,189,266, Koslow describes a four-fluted tapered drill bit having a cutting section of increasing diameter connected to a section of decreasing diameter. This is connected to a shank for mounting the bit in a power drill.

Applicant has invented a device which easily guides a hole bit or a hole saw back though a cut aperture in a work piece of any thickness.

SUMMARY OF THE INVENTION

The invention is a hole cutting tool and guide assembly for cutting an aperture in a work piece. The assembly includes a hole cutting tool member having a cylindrical cutting member with a cylindrical surface of selected circumference. The cylindrical cutting member has a plurality of circumference cutting teeth on a first end, with an anchoring point member centered on that first end. A shank member extends from a second end of the cylindrical cutting member opposite the cylindrical cutting member first end. The shank member has a circumference less than the selected circumference of the cylindrical cutting member, and is adapted for rotating the cutting tool member. A guide means provides at least one guide surface tapering from the cylindrical surface adjacent the second end of the cylindrical cutting member toward the shank member. The guide means assists in removal of the cutting tool member from an aperture formed by the cutting tool cylindrical cutting member.

The invention further includes a conical member with a first end and a smaller second end with an axial bore there through. The conical member first end has a circumference essentially equal to the selected circumference of the cylindrical cutting member of a cutting tool member. The conical member axial bore is of sufficient size to accommodate a cutting tool shank member therein. The conical member is positioned with the first end adjacent the second end of a cutting tool cylindrical cutting member with the cutting tool shank member positioned within the axial bore and extending beyond the conical member smaller second end. In one embodiment, the conical member first end has at least one opening positioned in register with a cutting edge of a cutting tool cylindrical cutting member for removal of cuttings produced by the cutting tool member cutting edge.

DESCRIPTION OF THE PREFERRED EMBODIMENTS

| Nomenclature | |
|---|---|
| 10 | Drill Bit and Guide Assembly |
| 20 | Hole Drill Bit Member |
| 25 | Cylindrical Cutting Member |
| 30 | First End of Cylindrical Cutting Member |
| 35 | Second End of Cylindrical Cutting Member |
| 40 | Cylindrical Surface of Cutting Member |
| 45 | Cutting Edge of Cutting Member |
| 50 | Aperture of Cutting Member |
| 55 | Shank Member of Drill Bit |
| 60 | Circumference Cutting Teeth of Cutting Member |
| 65 | Centering Anchor Point Member of Drill Bit |
| 100 | Conical Guide Member |
| 105 | First End of Conical Member |
| 110 | Second End of Conical Member |
| 115 | Axial Bore of Conical Member |
| 120 | Chip Aperture in Conical Member |
| 125 | Guide Surface of Conical Member |
| 130 | Threaded Aperture |
| 135 | Set Screw Member in Threaded Aperture |
| 140 | Planar Triangular Gusset Members |
| 145 | Guide Surface of Gusset Members |
| 150 | Conical Flange Guide Member |
| 155 | First End of Conical Flange Member |
| 160 | Second End of Conical Flange Member |
| 165 | Axial Bore of Conical Flange Member |

| -continued | |
|---|---|
| Nomenclature | |
| 170 | Chip Aperture in Conical Flange Member |
| 175 | Guide Surface of Conical Flange Member |
| 180 | Linear Bar Member |
| 185 | Guide Surface of Linear Bar Member |
| 200 | Hole Saw Member |
| 210 | Hole Saw and Guide Assembly |
| 220 | Conical Guide Member |

Construction

Several embodiments of the drill bit and guide assembly 10 of the present invention are shown in FIGS. 3 through 7, with the details of each component set forth below.

Figure 1:
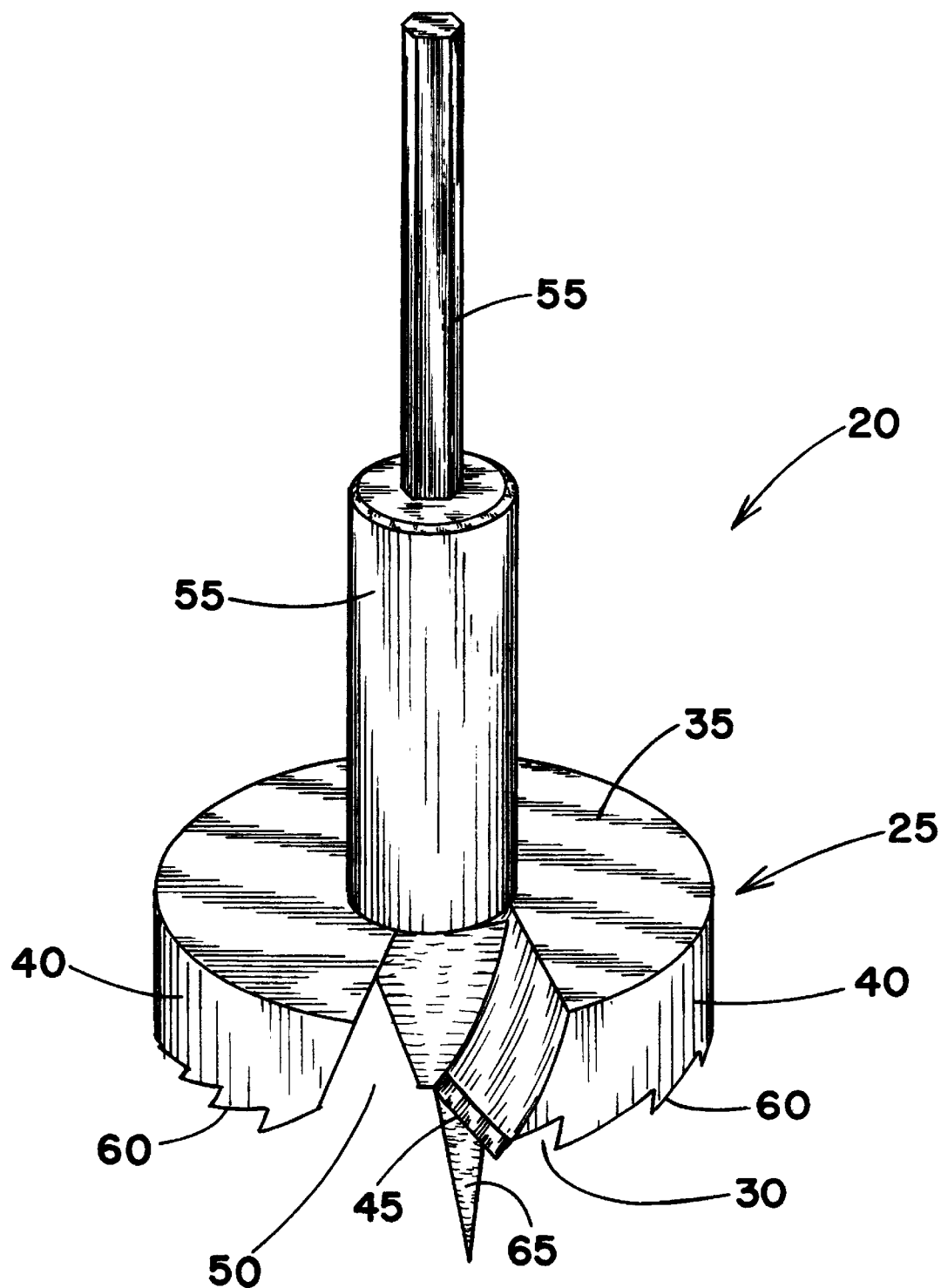
FIG. 1 is a perspective view of a commercially available hole bit tool.

Referring to FIG. 1, a typical hole drill bit member 20 is shown. The bit member 20 is composed of a cylindrical cutting member 25, having a first end 30 and a second end 35, and with a cylindrical surface 40. At least one cutting edge 45 is located at the first end 30 of the cylindrical member 25, with a corresponding aperture 50 in the cylindrical member 25, to allow removal of cuttings produced by the drill bit member 20 during use. A shank member 55 extends from the second end 35 of the cylindrical cutting member 25 for attachment to a rotary power source, such as a drill. The shank member 55 has a circumference less than that of the cylindrical cutting member 25 and may be decreased in diameter in steps so the shank member 55 can fit into a drill chuck.

The outer circumference of the first end 30 the cylindrical cutting member 25 may have a plurality of circumference cutting teeth 60 that extend slightly beyond the cutting edge 45 to assist in producing a smooth surface in the aperture made by the hole drill bit member 20. In addition, a centering anchor point member 65 may be attached to the center of the first end 30 of the cylindrical cutting member 25 for holding the drill bit member 20 in place as the bit cuts a hole in the work piece. The drill bit member 20 is fabricated from alloy steel for strength and durability. The cutting edge 45 and cutting teeth 60 of the drill bit member 20 may also be hardened to resist wear.

Once the drill bit member 20 cuts through the work piece and moves beyond the aperture produced, the operator must perfectly align the cylindrical cutting member 25 in the aperture to withdraw the drill bit member 25 and proceed to the next task. Attaining the perfect alignment of the cylindrical cutting member 25 in the cut aperture for withdrawal is particularly troublesome for larger diameter drill bit members 20. Applicant has devised a guide member device to overcome this difficulty.

Figure 2:
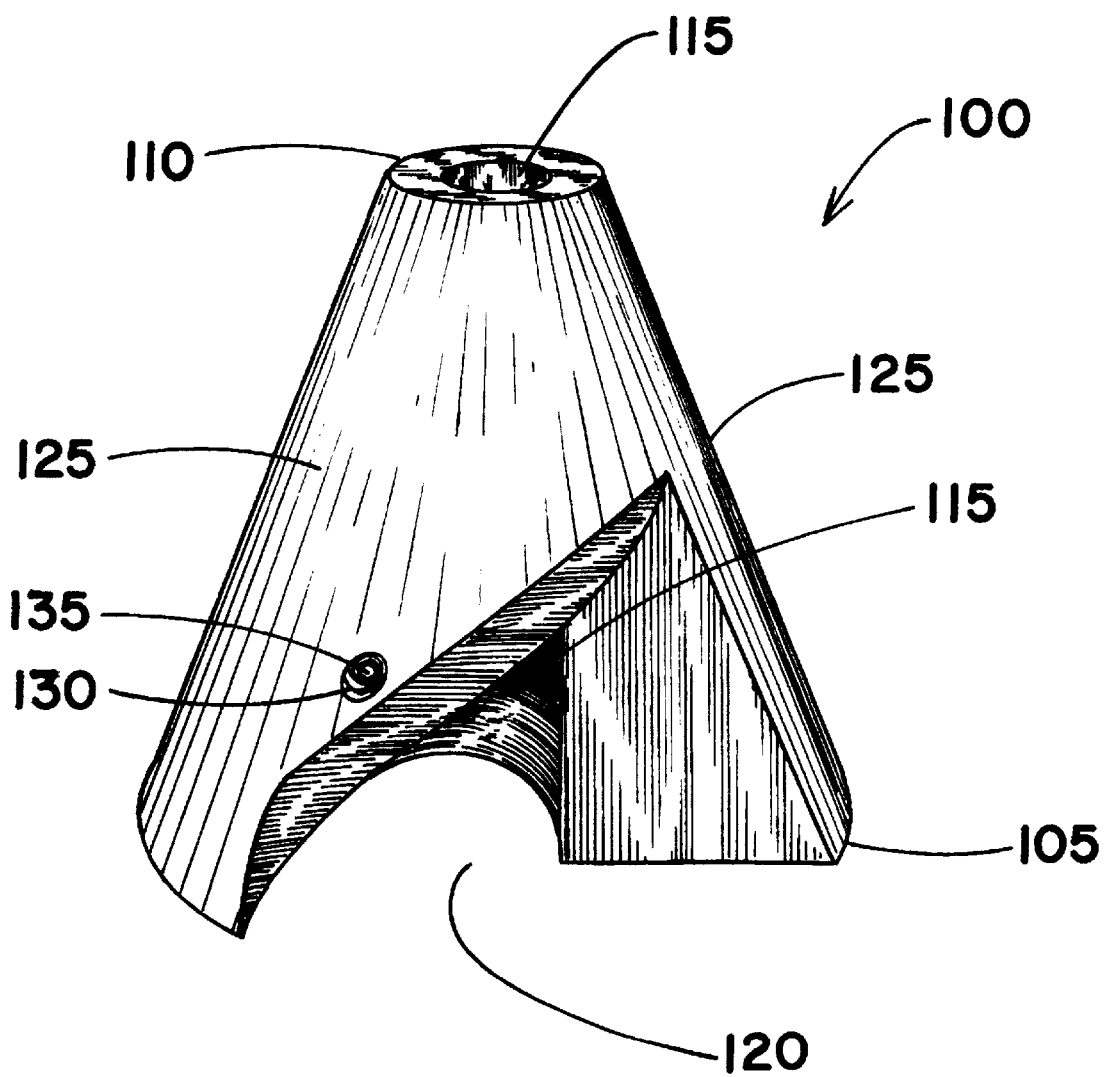
FIG. 2 is a perspective view of one embodiment of the conical guide member of the present invention.

Referring to FIG. 2, one embodiment of the guide member device is shown. The guide member device is a conical guide member 100 with a first end 105 and a smaller second end 110, and with an axial bore 115 there through. The conical member first end 105 has a circumference essentially equal to the circumference of the cylindrical cutting member 25. The conical member axial bore 115 is of sufficient size to accommodate the drill bit shank member 55 therein. The axial bore 115 need not be of uniform diameter, but can be fashioned to match the particular shape of each shank member 55. In use, the conical guide member 100 is positioned with the first end 105 adjacent the second end 35 of the cylindrical cutting member 25, and with the drill bit shank member 55 positioned within the conical member axial bore 115. The conical guide member 100 is sized such that the shank member 55 extends beyond the conical member smaller second end 110. The conical member first end 105 has at least one cut out opening or chip aperture 120 which can be positioned in register with the at least one cutting edge 45 and aperture 50 of the cylindrical cutting member 20 for removal of cuttings produced by the at least one cutting edge 45. The tapered surface 125 of the conical guide member 100 is generally uniform.

Figure 3:
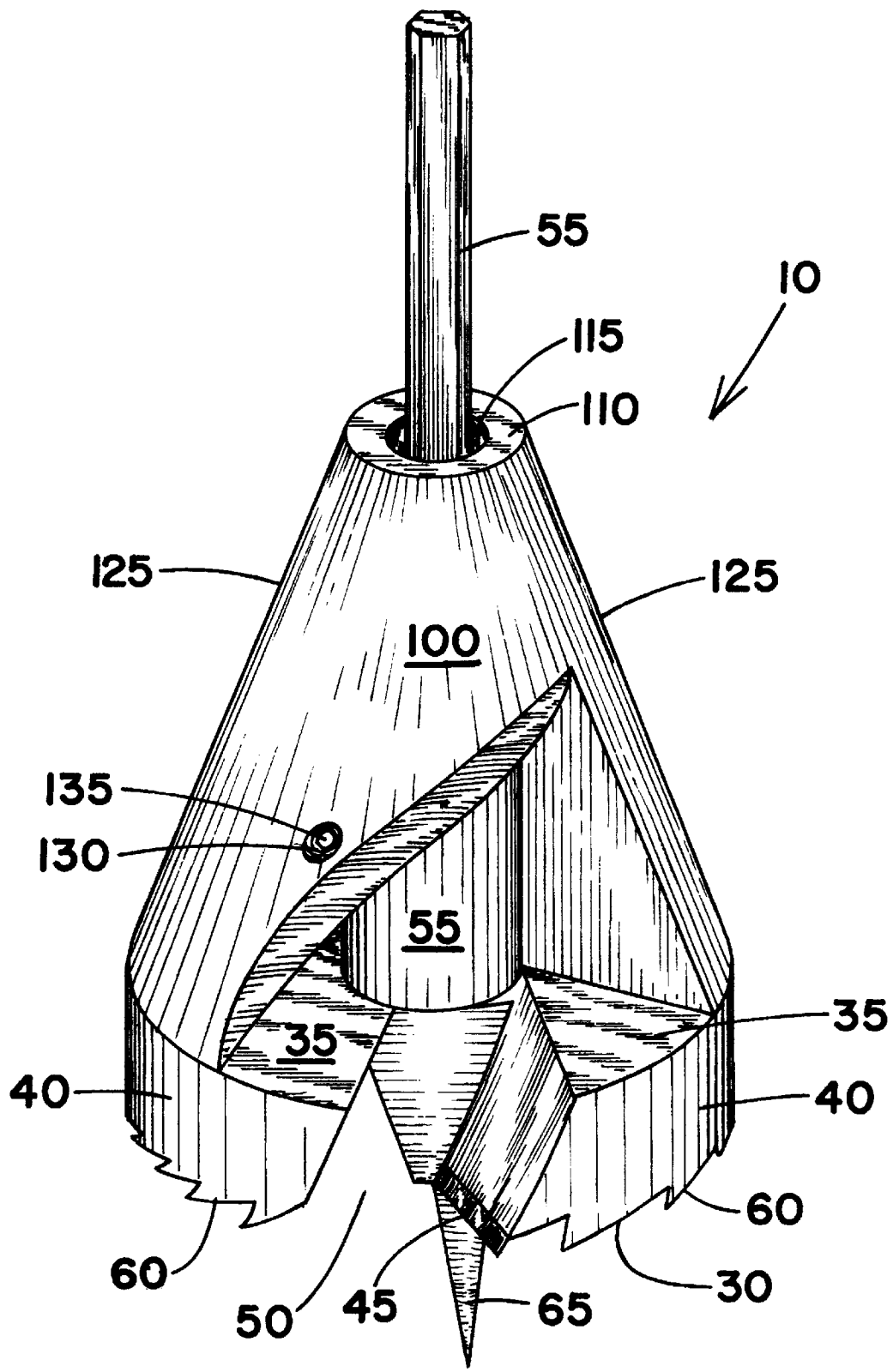
FIG. 3 is a perspective view of one embodiment of the hole bit and guide member assembly of the present invention.

FIG. 3 shows the conical guide member 100 attached to the hole drill bit member 20 to produce a drill bit and guide assembly 10. The tapered surface 125 of the conical member provides a guiding surface to enable an operator to easily remove the drill bit and guide assembly 10 from an aperture in a work piece. The conical guide member 100 may be permanently affixed to the drill bit member 20, however, it may be desirable to have the conical member 100 removably affixed to the drill bit member 20. A threaded aperture 130 extending from the conical guide surface 125 to the axial bore 115 fitted with a set screw 135 allows reversible fastening of the guide member 100 to the drill bit member 20. The set screw member 135 rotated into contact with the drill bit shank member 55 also maintains the positioning of the conical member cut out aperture 120 in register with the cutting edge 45 and aperture 50 of the cylindrical cutting member 25 of the drill bit member 20. For a drill bit member 20 having two or three cutting edges 45 with corresponding apertures 50, the conical guide member 100 contains two or three appropriately positioned chip apertures 120. The conical guide member 100 may be fabricated from wood or plastic; however, the guide member 100 is preferably fabricated from metal, such as aluminum, which provides strength, durability and light weight.

Figure 4:
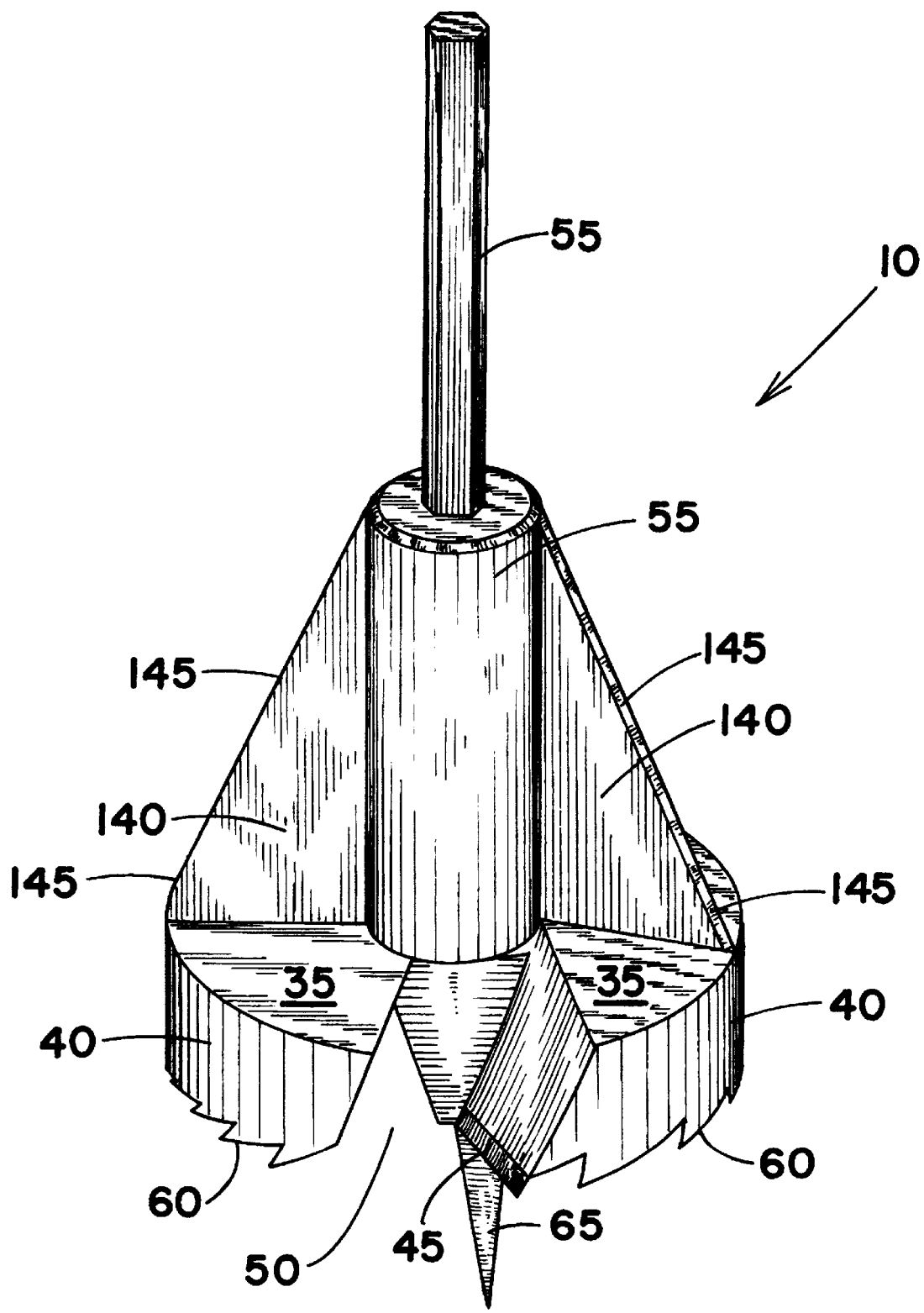
FIG. 4 is a perspective view of another embodiment of the hole bit and guide member assembly of the present invention.

FIG. 4 shows another embodiment of the guide surface means affixed to a drill bit member 20. The drill bit and guide assembly 10 of FIG. 4 includes at least two triangular gusset members 140, with each gusset member perpendicularly fastened to both the second end 35 of the drill bit cylindrical cutting member 25 and to the shank member 55. The triangular gusset members 140 are preferably fabricated from the same alloy steel used for the drill bit member 20. Each triangular gusset member 140 is sized to provide a guide surface 145 tapering from the cylindrical surface 40 of the cutting member 25 to the shank member 55. The gusset members 140 are positioned to divide the second end 35 of the cylindrical cutting member 25 into equal portions. Thus, with two gusset members 140 present, each are separated by 180 degrees. With three gusset members 140 present, each are separated by 120 degrees, and with four gusset members 140 present, the separation is 90 degrees. The gusset members 140 are permanently fastened to the drill bit member 20 such that each gusset avoids all apertures present in the cylindrical cutting member 25.

Figure 5:
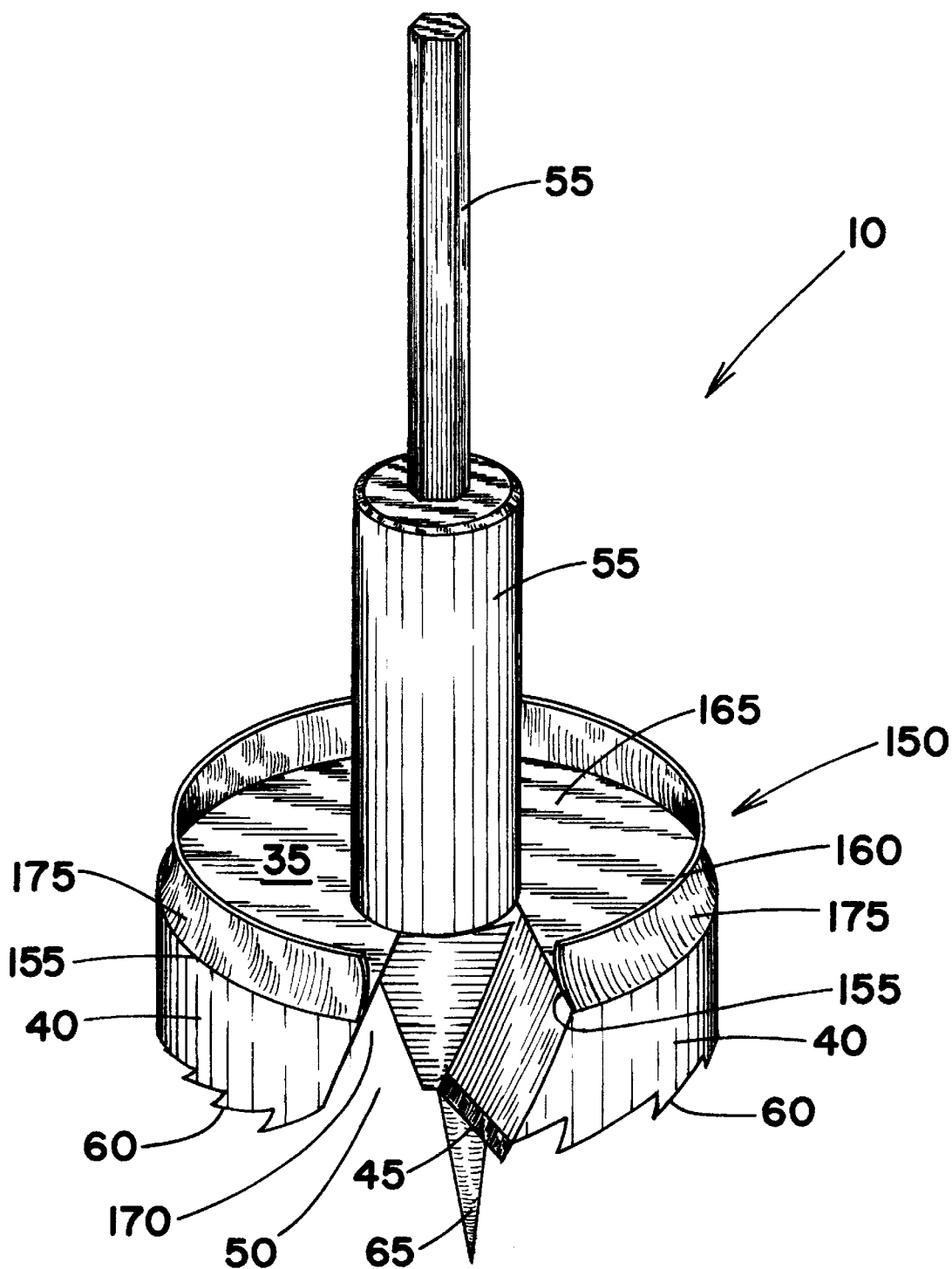
FIG. 5 is a perspective view of another embodiment of the hole bit and guide member assembly of the present invention.

Referring to FIG. 5, another embodiment of the drill bit and guide assembly 10 is shown. The guide means device is a conical flange guide member 150 with a first end 155, a smaller second end 160, and with an axial bore 165 there through. The conical flange member first end 155 has a circumference essentially equal to the circumference of the cylindrical cutting member 25. The conical member axial bore 165 is of sufficient size to accommodate the drill bit shank member 55 therein. In use, the conical flange guide member 150 is positioned with the first end 155 permanently secured to the second end 35 of the cylindrical cutting member 25, and with the drill bit shank member 55 positioned within the conical member axial bore 165. The conical flange guide member 150 is sized such that the shank member 55 extends beyond the conical flange member smaller second end 160. The conical flange member 150 has at least one cut out opening or chip aperture 170 which is positioned in register with the at least one cutting edge 45 and aperture 50 of the cylindrical cutting member 20 for removal of cuttings produced by the at least one cutting edge 45. The tapered surface 175 of the conical flange guide member 150 is generally uniform. The tapered surface 175 of the conical flange member 150 provides a guiding surface to enable an operator to easily remove the drill bit and guide assembly 10 from an aperture in a work piece.

Figure 6:
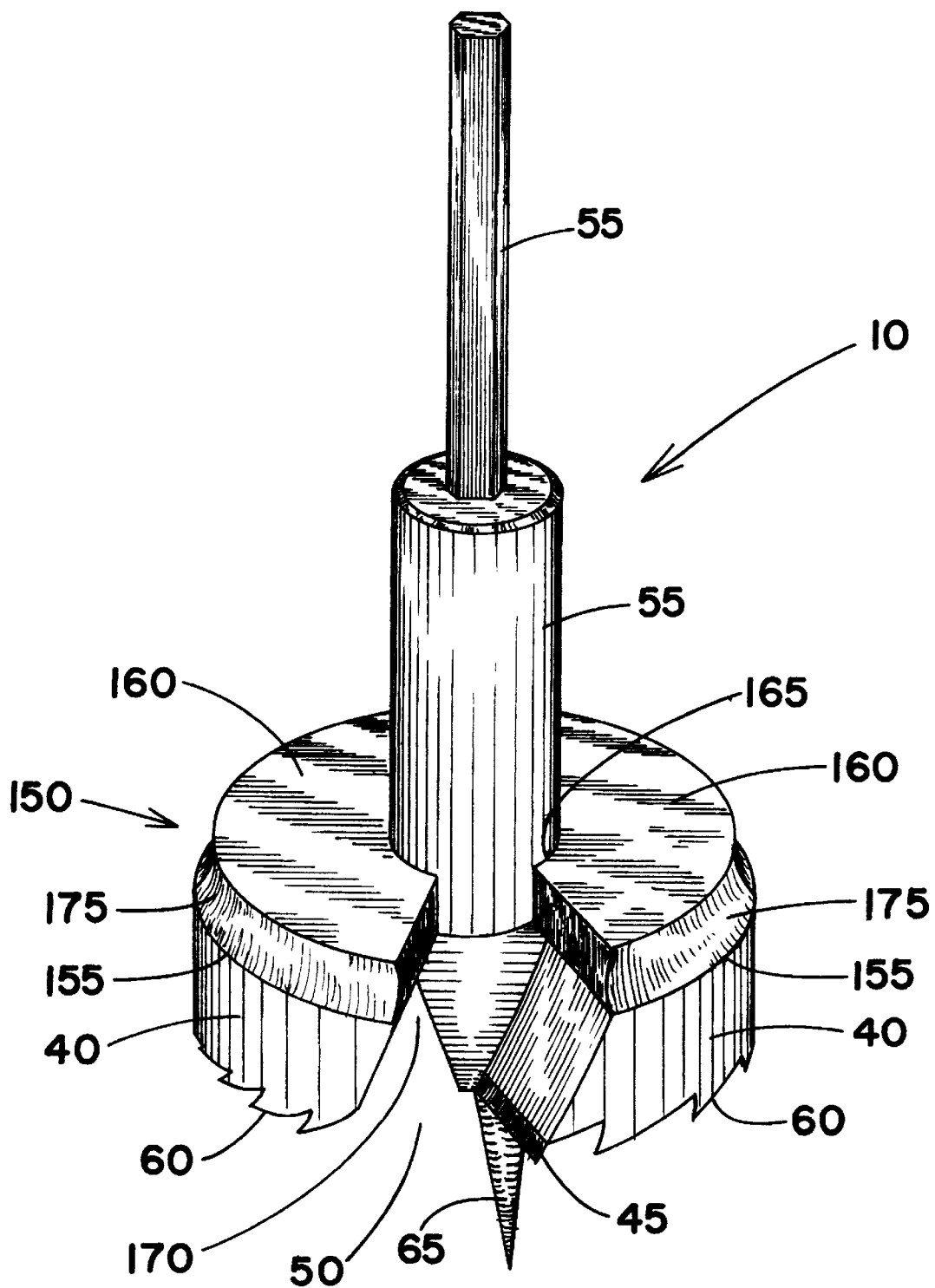
FIG. 6 is a perspective view of a variation of the embodiment of the hole bit and guide member assembly of FIG. 5.

FIG. 6 shows the conical flange guide member 150 with slightly different dimensions. The conical member axial bore 165 is sized to fit snugly around the lower portion of drill bit shank member 55. In use, the conical flange guide member 150 is positioned with the first end 155 essentially covering the entire second end 35 of the cylindrical cutting member 25 and permanently secured thereto. It may be preferable to fabricate the conical flange guide member 150 and hole bit member 20, shown in FIGS. 5 and 6, as a single unit of construction.

Figure 7:
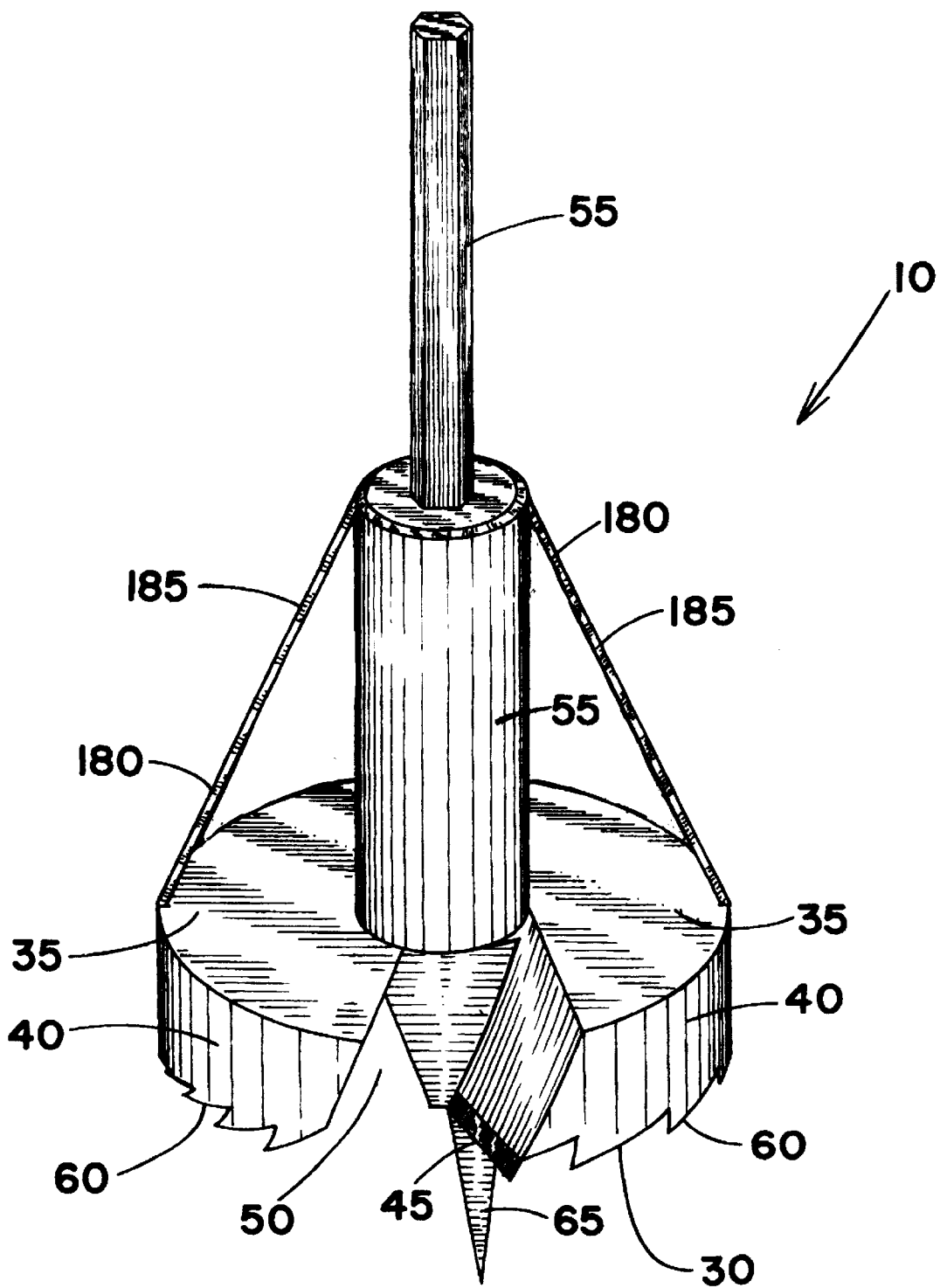
FIG. 7 is a perspective view of yet another embodiment of the hole bit and guide member assembly of the present invention.

FIG. 7 shows yet another embodiment of the guide surface means affixed to a drill bit member 20. The drill bit and guide assembly 10 of FIG. 7 includes at least two linear bar members 180, with each bar member fastened at one end to the second end 35 of the drill bit cylindrical cutting member 25 adjacent the cylindrical surface 40 and at the other end to the shank member 55. The linear bar members 180 may be round or polyhedral in cross section, and are preferably fabricated from the same alloy steel used for the drill bit member 20. Each linear bar member 180 is positioned to provide a guide surface 185 tapering from the cylindrical surface 40 of the cutting member 25 to the shank member 55. The bar members 180 are radially positioned to divide the second end 35 of the cylindrical cutting member 25 into equal portions. Thus, with two bar members 180 present, each are separated by 180 degrees, with three bar members 180 present, each are separated by 120 degrees, and with four bat members 180 present, the separation is 90 degrees. The linear bar members 180 are permanently fastened to the drill bit member 20 such that each bar member avoids all apertures 50 present in the cylindrical cutting member 25.

Figure 8:
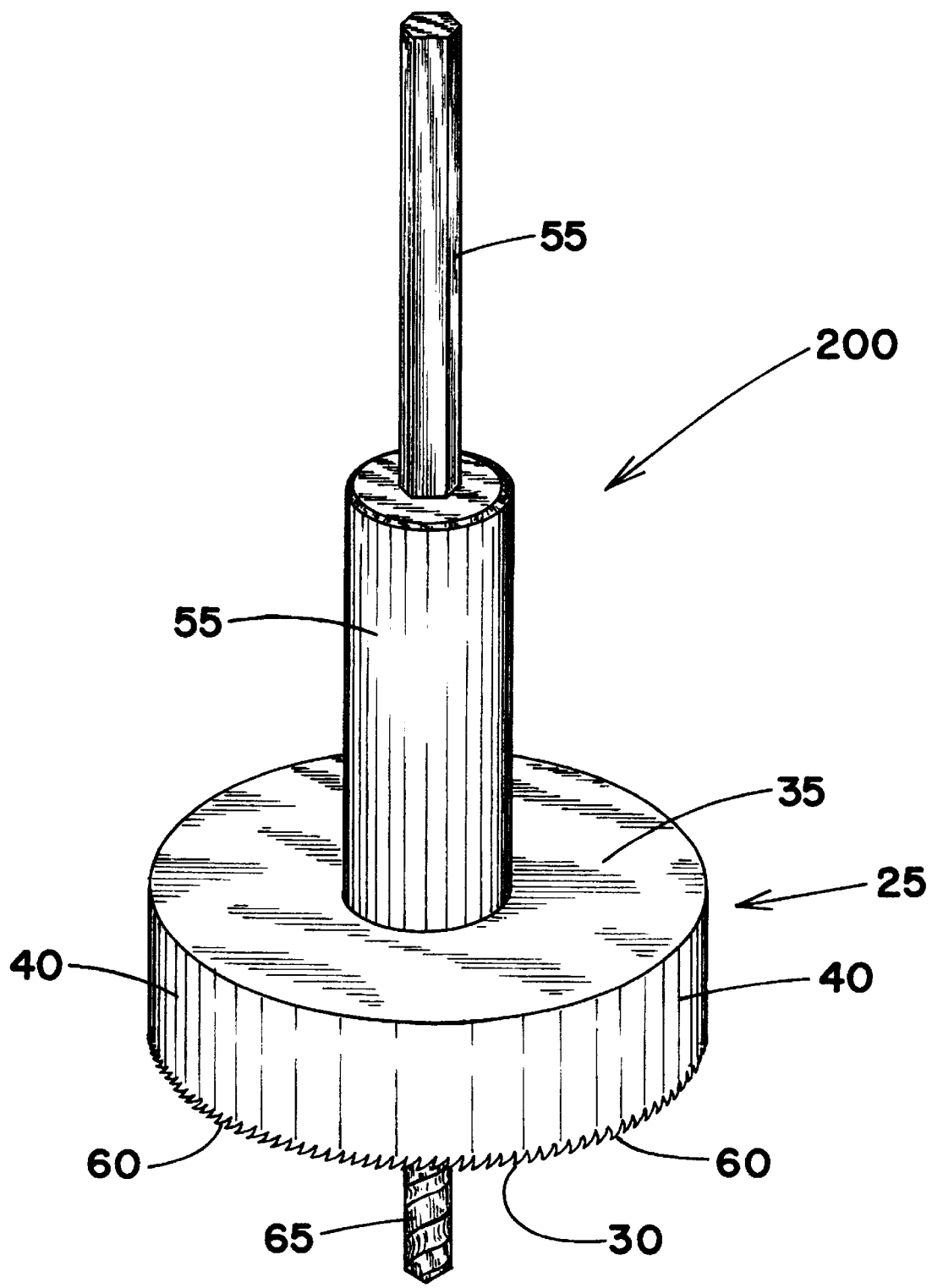
FIG. 8 is a perspective view of a commercially available hole saw tool.

The hole saw tool member 200 shown in FIG. 8 is similar in construction to the hole bit member 20. In FIGS. 8–13, those components common to the components of FIGS. 1–7 are designated with the same indica. Several embodiments of the hole saw and guide assembly 210 of the present invention are shown in FIGS. 10 through 13, with the details of each component set forth below.

Referring to FIG. 8, a typical hole saw member 200 is shown. The hole saw member 200 is composed of a cylindrical cutting member 25 having a first end 30 and a second end 35, and with a cylindrical surface 40. A shank member 55 extends from the second end 35 of the cylindrical cutting member 25 for attachment to a rotary power source, such as a drill. The shank member 55 has a circumference less than that of the cylindrical cutting member 25 and may be decreased in diameter in steps so the shank member 55 can fit into a drill chuck.

The outer circumference of the first end 30 the cylindrical cutting member 25 has a plurality of circumference cutting teeth 60 that cut through the work piece and produce a smooth surface in the aperture made by the hole saw member 200. The cylindrical cutting member 25 is open from the first end 30 with a hollow interior that accommodates the plug cut from the work piece by the circumference cutting teeth 60. In addition, a centering anchor point member 65 is attached to the center of the hollow cylindrical cutting member 25 for holding the hole saw member 200 in place as the saw cuts a hole in the work piece. The anchoring point member 65 for the hole saw member 200 is preferably a small diameter twist drill bit that drills a pilot hole in the work piece to anchor the hole saw member 200 in position during use.

The hole saw member 200 is fabricated from alloy steel for strength and durability. The hole saw member 200 is generally employed for cutting holes in sheet material, such as latch holes in doors and the like. The cut out plug from the work piece moves up into the hollow cylindrical cutting member 25 and must be removed to continue cutting another hole with the hole saw member 200.

Once the hole saw member 200 cuts through the work piece and moves beyond the aperture produced, the operator must perfectly align the cylindrical cutting member 25 in the aperture to withdraw the cylindrical cutting member 25 and proceed to the next task. Attaining the perfect alignment of the cylindrical cutting member 25 in the cut aperture for withdrawal is particularly troublesome for larger diameter hole saw members 200. Applicant has devised a guide member device to overcome this difficulty.

Figure 9:
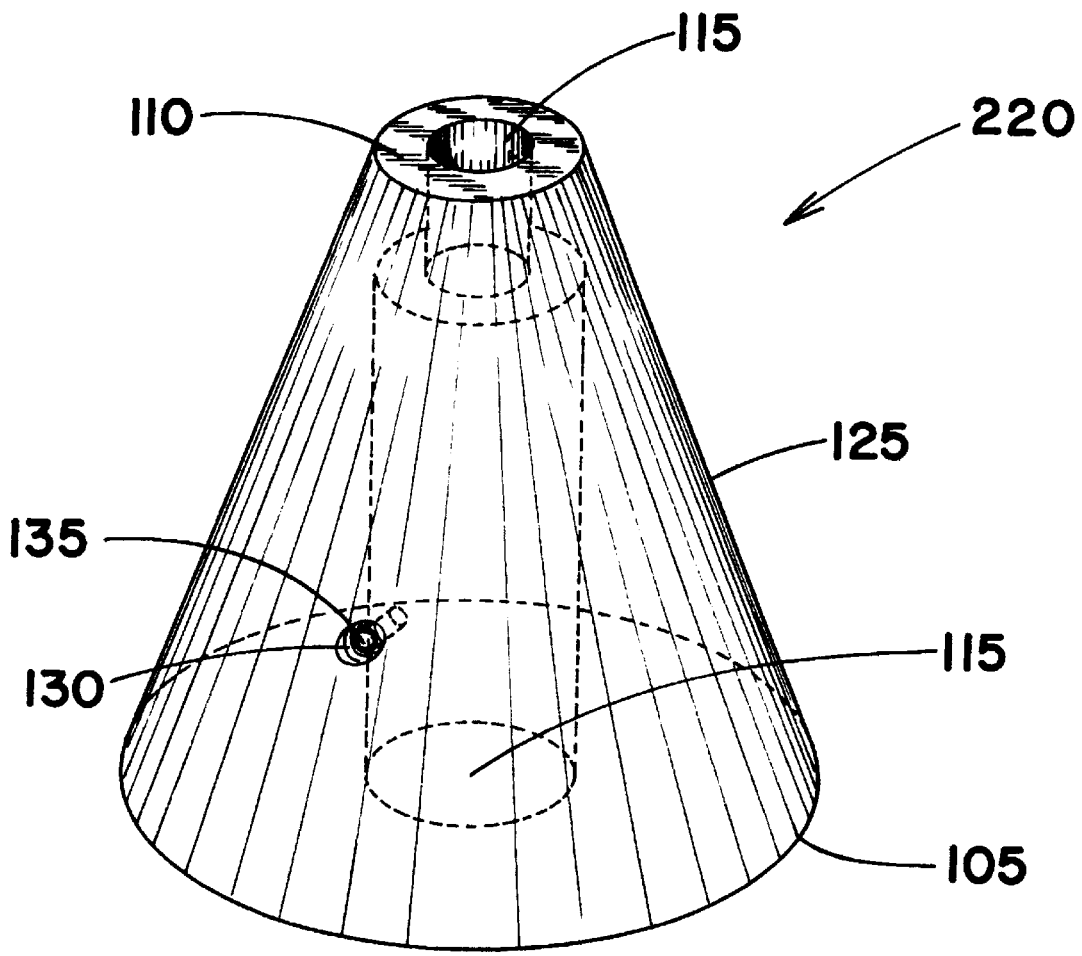
FIG. 9 is a perspective view of another embodiment of the conical guide member of the present invention.

Referring to FIG. 9, one embodiment of the guide member device is shown. The guide member device is a conical guide member 220 with a first end 105 and a smaller second end 110, and with an axial bore 115 there through. The conical member first end 105 has a circumference essentially equal to the circumference of the hole saw cylindrical cutting member 25. The conical member axial bore 115 is of sufficient size to accommodate the hole saw shank member 55 therein. The axial bore 115 need not be of uniform diameter, but can be fashioned to match the particular shape of each shank member 55. In use, the conical guide member 220 is positioned with the first end 105 adjacent the second end 35 of the cylindrical cutting member 25 with the hole saw shank member 55 positioned within the conical member axial bore 115. The conical guide member 220 is sized such that the shank member 55 extends beyond the conical member smaller second end 110. The tapered surface 125 of the conical guide member 220 is generally uniform.

Figure 10:
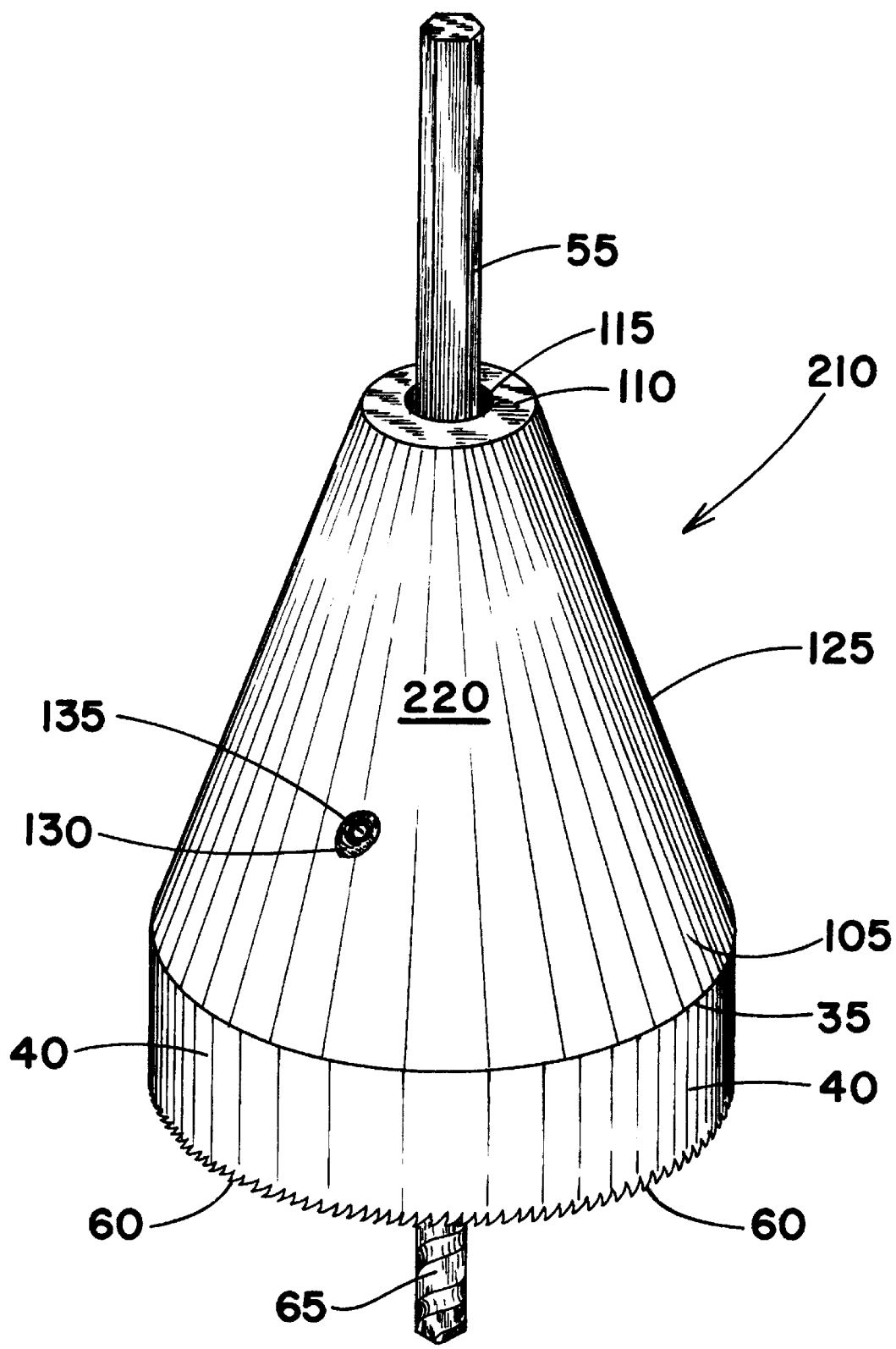
FIG. 10 is a perspective view of one embodiment of the hole saw and guide member assembly of the present invention.

FIG. 10 shows the conical guide member 220 attached to the hole saw member 200 to produce a hole saw and guide assembly 210. The tapered surface 125 of the conical member provides a guiding surface to enable an operator to easily remove the hole saw and guide assembly 210 from an aperture in a work piece. The conical guide member 220 may be permanently affixed to the hole saw member 200; however, it may be desirable to have the conical member 220 removably affixed to the hole saw member 200. A threaded aperture 130, extending from the conical guide surface 125 to the axial bore 115 is fitted with a set screw 135, which allows reversible fastening of the guide member 220 to the hole saw member 200. The set screw member 135 is rotated into contact with the hole saw shank member 55 for reversibly maintaining the positioning of the conical member 220. The conical guide member 220 may be fabricated from wood or plastic; however, the guide member 220 is preferably fabricated from metal, such as aluminum, which provides strength, durability and light weight.

Figure 11:
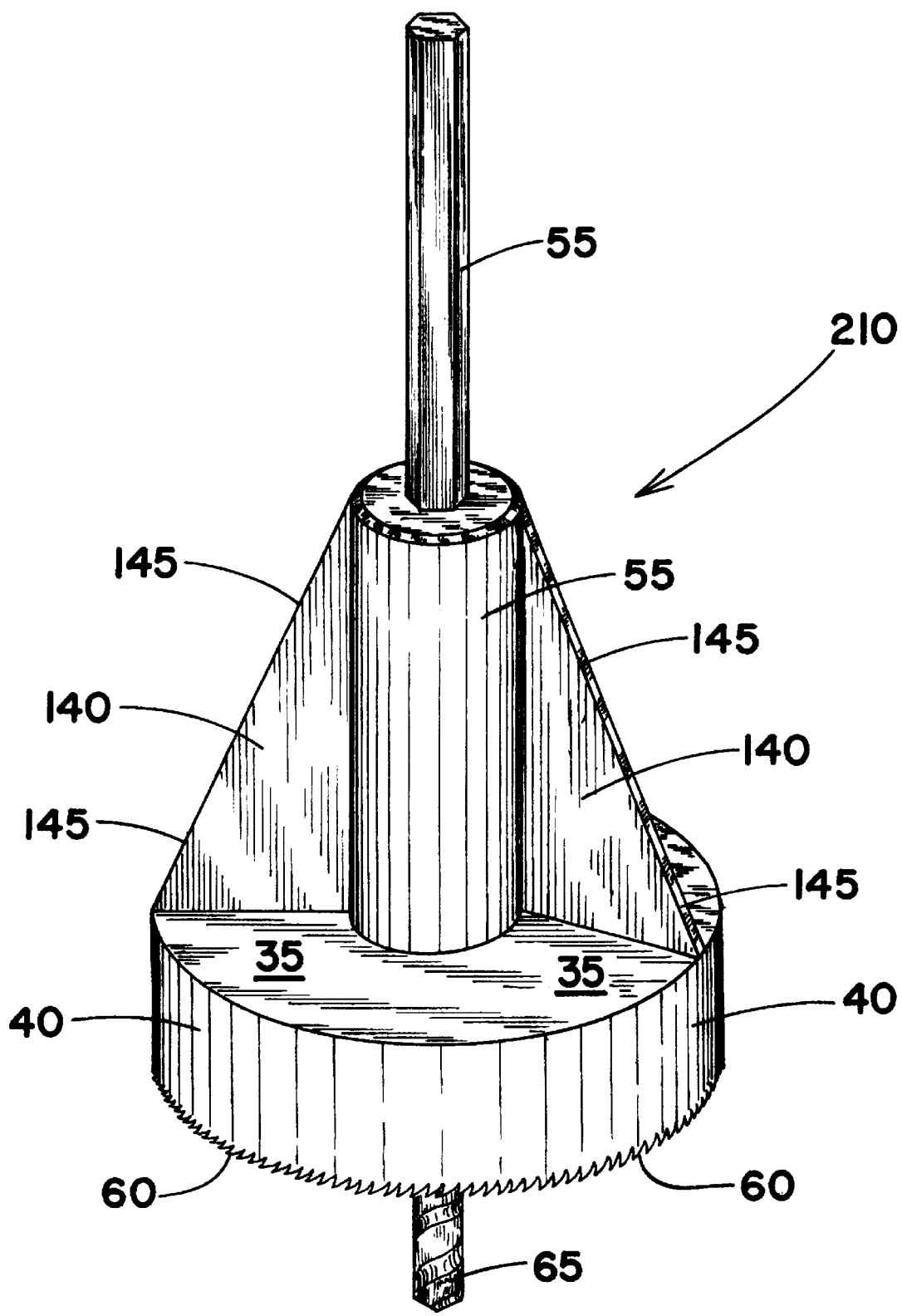
FIG. 11 is a perspective view of another embodiment of the hole saw and guide member assembly of the present invention.

FIG. 11 shows another embodiment of the guide surface means affixed to a hole saw member 200. The hole saw and guide assembly 210 of FIG. 11 includes at least two triangular gusset members 140, with each gusset member perpendicularly fastened to both the second end 35 of the hole saw cylindrical cutting member 25 and to the shank member 55. The triangular gusset members 140 are preferably fabricated from the same alloy steel used for the hole saw member 200. Each triangular gusset member 140 is sized to provide a guide surface 145 tapering from the cylindrical surface 40 of the cutting member 25 to the shank member 55. The gusset members 140 are positioned to divide the second end 35 of the cylindrical cutting member 25 into equal portions. Thus, with two gusset members 140 present, each are separated by 180 degrees. With three gusset members 140 present, each are separated by 120 degrees, and with four gusset members 140 present, the separation is 90 degrees. The gusset members 140 are permanently fastened to the hole saw member 200.

Figure 12:
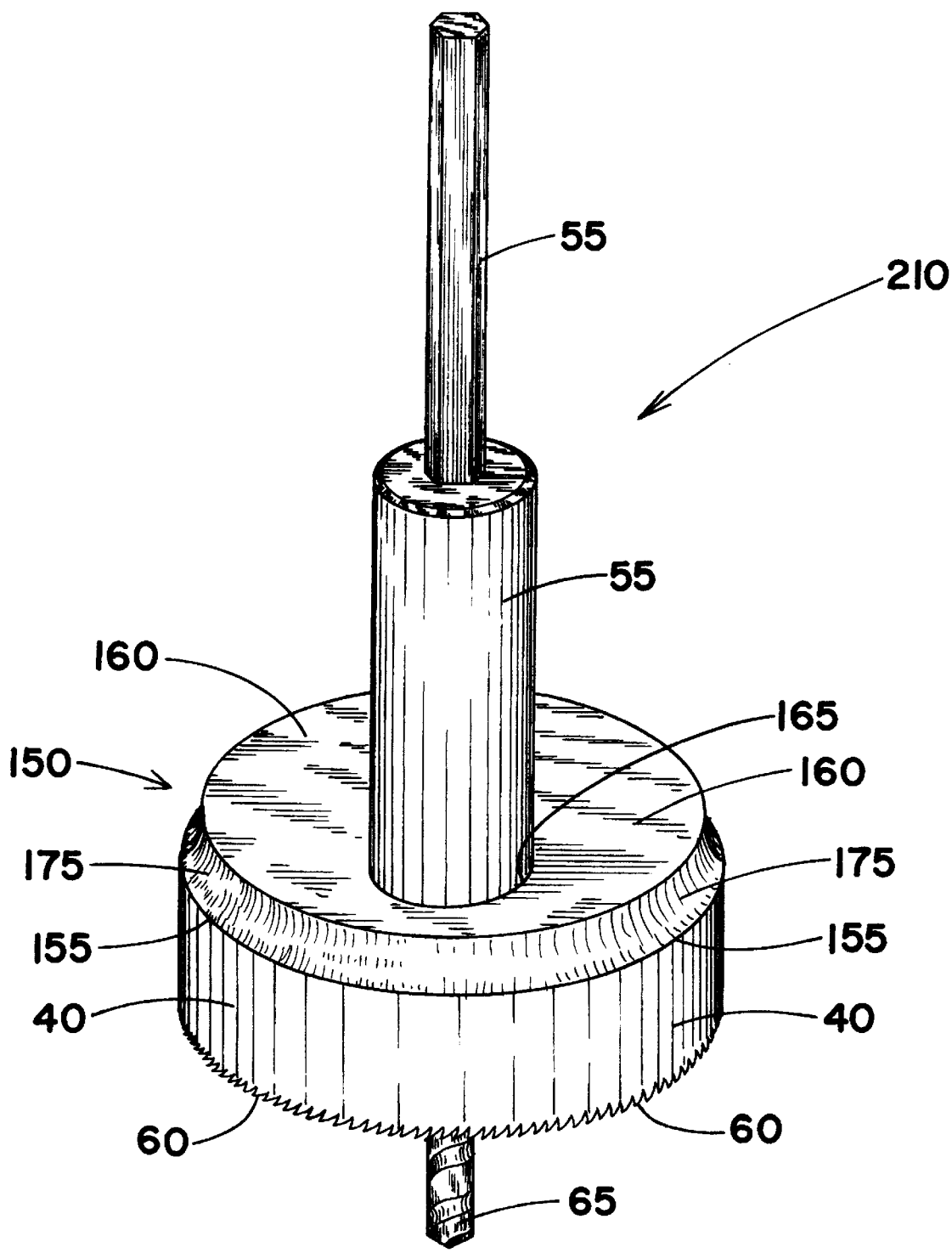
FIG. 12 is a perspective view of another embodiment of the hole saw and guide member assembly of the present invention.

Referring to FIG. 12, another embodiment of the hole saw and guide assembly 210 is shown. The guide means device is a conical flange guide member 150 with a first end 155 and a smaller second end 160, and with an axial bore 165 there through. The conical flange member first end 155 has a circumference essentially equal to the circumference of the cylindrical cutting member 25. The conical member axial bore 165 is of sufficient size to accommodate the hole saw shank member 55, and is sized to fit snugly around the lower portion of hole saw shank member 55. In use, the conical flange guide member 150 is positioned with the first end 155 permanently secured to the second end 35 of the cylindrical cutting member 25, with the hole saw shank member 55 positioned within the conical member axial bore 165. The conical flange guide member 150 is sized such that the shank member 55 extends beyond the conical flange member smaller second end 160. The tapered surface 175 of the conical flange guide member 150 is generally uniform. The tapered surface 175 of the conical flange member 150 provides a guiding surface to enable an operator to easily remove the hole saw and guide assembly 210 from an aperture in a work piece. It may be preferable to fabricate the conical flange guide member 150 and hole saw member 200 as a single unit of construction.

Figure 13:
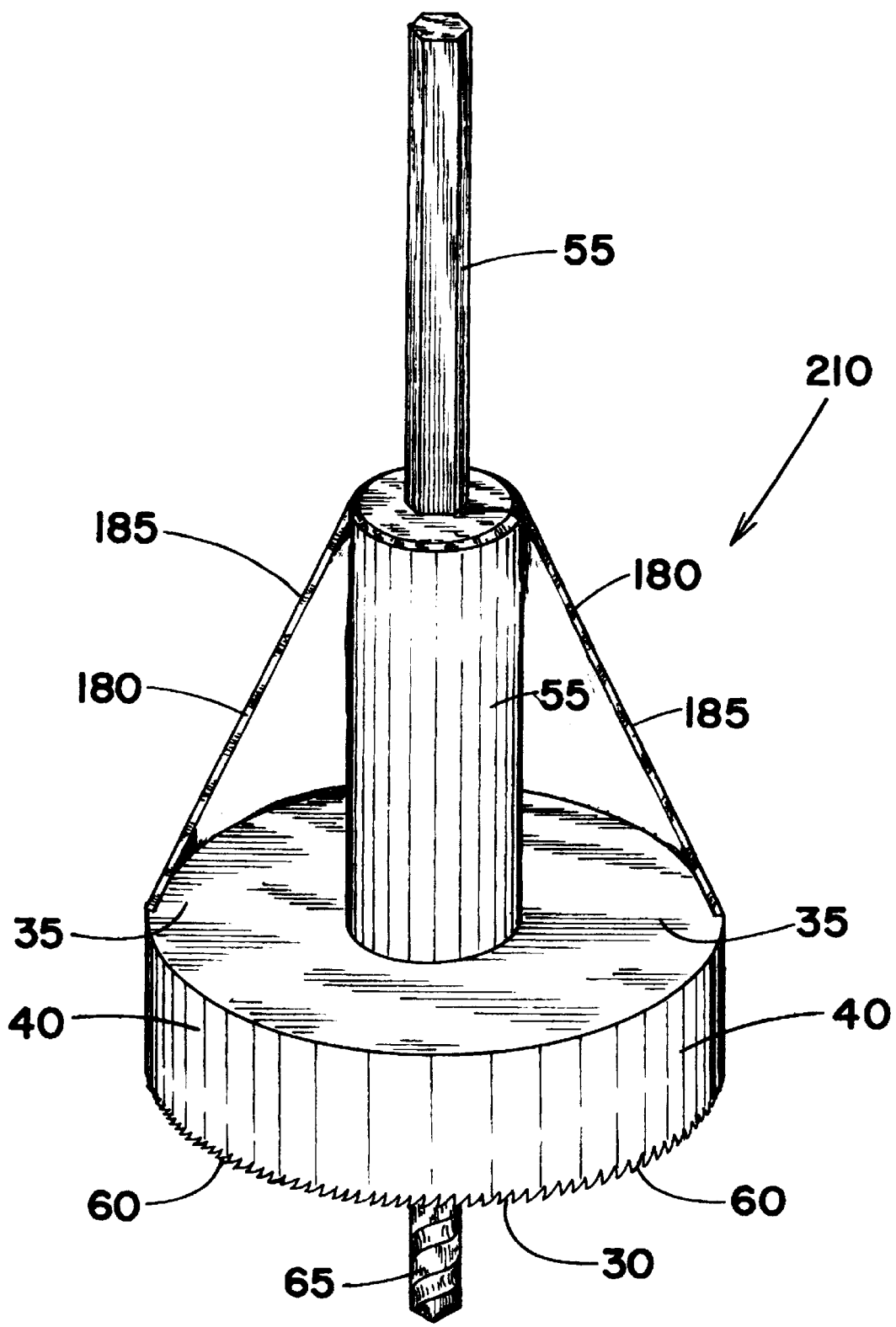
FIG. 13 is a perspective view of yet another embodiment of the hole saw and guide member assembly of the present invention.

FIG. 13 shows yet another embodiment of the guide surface means affixed to a hole saw member 200. The hole saw and guide assembly 210 of FIG. 13 includes at least two linear bar members 180, with each bar member fastened at one end to the second end 35 of the hole saw cylindrical cutting member 25 adjacent the cylindrical surface 40, and at the other end to the shank member 55. The linear bar members 180 may be round or polyhedral in cross section and are preferably fabricated from the same alloy steel used for the hole saw member 200. Each linear bar member 180 is positioned to provide a guide surface 185 tapering from the cylindrical surface 40 of the hole saw cutting member 25 to the shank member 55. The bar members 180 are radially positioned to divide the second end 35 of the cylindrical cutting member 25 into equal portions. Thus, with two bar members 180 present, each are separated by 180 degrees. With three bar members 180 present, each are separated by 120 degrees, and with four bat members 180 present, the separation is 90 degrees. The linear bar members 180 are permanently fastened to the hole saw member 200.

While the invention has been particularly shown and described with reference to a preferred embodiment thereof, it will be understood by those skilled in the art that various changes in form and details may be made therein without departing from the spirit and scope of the invention.

I claim:

1. A hole cutting tool and guide assembly for cutting an aperture in a work piece comprising:

(a) a hole cutting tool member having a cylindrical cutting member with a cylindrical surface of selected circumference, said cylindrical cutting member having a plurality of circumference cutting teeth on a first end thereof, an anchoring point member centered on said first end thereof, and a shank member extending from a second end of said cylindrical cutting member opposite said cylindrical cutting member first end, said shank member having a circumference less than said selected circumference of said cylindrical cutting member, said shank member adapted for rotating said cutting tool member; and (b) guide means providing at least one guide surface tapering from said cylindrical surface adjacent said second end of said cylindrical cutting member toward said shank member, said guide means assisting in removal of said cutting tool member from the aperture formed by said cutting tool cylindrical cutting member.

2. The hole cutting tool and guide assembly according to claim 1 wherein, said guide means comprises a conical member with a first end and a smaller second end with an axial bore there through, said conical member first end of circumference essentially equal to said selected circumference of said cylindrical cutting member, and said conical member axial bore of sufficient size to accommodate said shank member therein, said conical member having at least one guide surface tapering from said first end to said second end thereof, said conical member fastened with said first end adjacent said second end of said cylindrical cutting member with said cutting tool shank member positioned within said axial bore and extending beyond said conical member smaller second end.

3. The hole cutting tool and guide assembly according to claim 1 wherein, said guide means comprises a conical flange member with a first end and a smaller second end with an axial bore there through, said conical flange member first end of circumference essentially equal to said selected circumference of said cylindrical cutting member, and said conical flange member axial bore of sufficient size to accommodate said cutting tool shank member therein, said conical flange member having at least one guide surface tapering from said first end to said second end thereof, said conical flange member first end permanently fastened to said second end of said cylindrical cutting member with said cutting tool shank member positioned within said axial bore and extending beyond said conical flange member smaller second end.

4. The hole cutting tool and guide assembly according to claim 1 wherein, said guide means comprises at least two triangular gusset members, each gusset member perpendicularly fastened to both said second end of said cutting tool cylindrical cutting member and to said cutting tool shank member, each gusset member sized to provide a guide surface tapering from said cylindrical surface adjacent said cutting member second end to said shank member, said gusset members positioned to divide said second end of said cylindrical cutting member into equal portions.

5. The hole cutting tool and guide assembly according to claim 1 wherein, said guide means comprises at least two linear bar members, each bar member fastened at a first end to said second end of said cutting tool cylindrical cutting member adjacent said cylindrical surface thereof, and at a second end to said cutting tool shank member, each linear bar member providing a guide surface tapering from said cylindrical surface adjacent said second end of said cutting member to said shank member, said linear bar members positioned to divide said second end of said cylindrical cutting member into equal portions.

6. The hole cutting tool and guide assembly according to claim 1 further comprising, at least one cutting edge at said first end of said cylindrical cutting member, with an associated chip aperture extending from said cylindrical member first end to said second end, through said cylindrical cutting member, and adjoining said at least one cutting edge.

7. The hole cutting tool and guide assembly according to claim 6 wherein, said guide means comprises a conical member with a first end and a smaller second end with an axial bore there through, said conical member first end of circumference essentially equal to said selected circumference of said cylindrical cutting member, and said conical member axial bore of sufficient size to accommodate said shank member therein, said conical member having at least one guide surface tapering from said first end to said second end thereof, said conical member fastened with said first end adjacent said second end of said cylindrical cutting member with said cutting tool shank member positioned within said axial bore and extending beyond said conical member smaller second end, said conical member first end having at least one opening positioned in register with said at least one cutting edge and chip aperture of said cylindrical cutting member for removal of cuttings produced by said at least one cutting edge.

8. The hole cutting tool and guide assembly according to 7 wherein, said conical guide member is reversibly fastened to said hole cutting tool member.

9. The hole cutting tool and guide assembly according to 8 further comprising, at least one set screw member contained in at least one threaded aperture, said at least one threaded aperture connecting said conical member guide surface and said axial bore therein.

10. The hole cutting tool assembly according to 7 wherein, said conical guide member is fabricated from aluminum metal.

11. The hole cutting tool and guide assembly according to claim 6 wherein, said guide means comprises a conical flange member with a first end and a smaller second end with an axial bore there through, said conical flange member first end of circumference essentially equal to said selected circumference of said cylindrical cutting member, and said conical flange member axial bore of sufficient size to accommodate said cutting tool shank member therein, said conical member having at least one guide surface tapering from said first end to said second end thereof, said conical flange member first end permanently fastened to said second end of said cylindrical cutting member with said hole cutting tool shank member positioned within said axial bore and extending beyond said conical flange member smaller second end, said conical flange member having at least one opening positioned in register with said at least one cutting edge and chip aperture of said cylindrical cutting member for removal of cuttings produced by said at least one cutting edge.

12. The hole cutting tool and guide assembly according to claim 11 wherein, said conical flange member is fabricated from alloy steel.

13. The hole cutting tool and guide assembly according to claim 6 wherein, said guide means comprises at least two triangular gusset members, each gusset member perpendicularly fastened to both said second end of said cutting tool cylindrical cutting member and to said cutting tool shank member, each gusset member sized to provide a guide surface tapering from said cylindrical surface adjacent said cutting member second end to said shank member, said gusset members positioned to divide said second end of said cylindrical cutting member into equal portions.

14. The hole cutting tool and guide assembly according to claim 13 wherein, said triangular gusset members are fabricated from alloy steel.

15. The hole cutting tool and guide assembly according to claim 6 wherein, said guide means comprises at least two linear bar members, each bar member fastened at a first end to said second end of said hole cutting tool cylindrical cutting member adjacent said cylindrical surface thereof, and at a second end to said shank member, each linear bar member providing a guide surface tapering from said cylindrical surface adjacent said second end of said cutting member to said shank member, said linear bar members positioned to divide said second end of said cylindrical cutting member into equal portions.

16. The hole cutting tool and guide assembly according to claim 15 wherein, said linear bar members are fabricated from alloy steel.

17. A guide means for attachment to a hole cutting tool with a cylindrical cutting member of selected circumference, said cutting member having hole cutting means on a first end and a shank member attached to a second end, said guide means assisting in removal of the hole cutting tool from an aperture cut in a work piece, said guide means comprising;

(a) a conical member with a first end and a smaller second end, said conical member having an axial bore there through, said conical member first end of circumference essentially equal to the selected circumference of the hole cutting tool cylindrical cutting member, and said conical member axial bore of sufficient size to accommodate the hole cutting tool shank member therein, said conical member having at least one guide surface tapering from said first end to said second end thereof, and (b) means for securing said conical member to the hole cutting tool.

18. The guide means according to claim 17 further comprising, at least one cut out aperture positioned at said conical member first end for removal of cuttings produced by the hole cutting tool.

19. The guide means according to 17 wherein, said means for securing said conical member to the hole cutting tool comprises at least one set screw member contained in at least one threaded aperture, said at least one threaded aperture connecting said conical member guide surface and said axial bore therein.

20. The guide means according to 17 wherein, said conical guide member is fabricated from aluminum metal.

* * * * *